United States Patent
Chi

(10) Patent No.: US 10,795,728 B2
(45) Date of Patent: Oct. 6, 2020

(54) SHARING EXPANSION DEVICE, CONTROLLING METHOD AND COMPUTER USING THE SAME

(71) Applicant: QUANTA COMPUTER INC., Taoyuan (TW)

(72) Inventor: Hsiang-Chih Chi, Taoyuan (TW)

(73) Assignee: QUANTA COMPUTER INC. (TW)

( * ) Notice: Subject to any disclaimer, the term of this patent is extended or adjusted under 35 U.S.C. 154(b) by 92 days.

(21) Appl. No.: 16/192,154

(22) Filed: Nov. 15, 2018

(65) Prior Publication Data

US 2019/0377608 A1    Dec. 12, 2019

(30) Foreign Application Priority Data

Jun. 8, 2018  (TW) .............................. 107119867 A

(51) Int. Cl.
    *G06F 9/50*    (2006.01)
    *G06F 3/14*    (2006.01)
    *G06F 21/31*    (2013.01)

(52) U.S. Cl.
    CPC .......... *G06F 9/5027* (2013.01); *G06F 3/1431* (2013.01); *G06F 21/31* (2013.01)

(58) Field of Classification Search
    CPC ............................... G06F 9/5027; G06F 21/31
    USPC ..................................................... 718/1–108
    See application file for complete search history.

(56) References Cited

U.S. PATENT DOCUMENTS

| | | | | |
|---|---|---|---|---|
| 6,170,042 B1 * | 1/2001 | Gaertner | ............... | G06F 3/0613 710/39 |
| 7,370,329 B2 * | 5/2008 | Kumar | .................... | G06F 9/465 709/203 |
| 8,316,371 B2 * | 11/2012 | Chaffee | .................. | G06Q 10/06 718/103 |

(Continued)

FOREIGN PATENT DOCUMENTS

| | | |
|---|---|---|
| TW | 201430546 A | 8/2014 |
| TW | 201502842 A | 1/2015 |
| TW | 201721508 A | 6/2017 |

OTHER PUBLICATIONS

Lim, Kevin, et al. "Disaggregated memory for expansion and sharing in blade servers." ACM SIGARCH computer architecture news 37.3 (2009): pp. 267-278. (Year: 2009).*

(Continued)

*Primary Examiner* — Satish Rampuria
(74) *Attorney, Agent, or Firm* — Innovation Counsel LLP

(57) ABSTRACT

A sharing expansion device, a controlling method and a computer using the same are provided. The computer has at least one first user account and a second user account. The first user account has been logged in the computer. The computer is connected to a first input device and a first monitor. The first input device provides at least one first command. The sharing expansion device includes at least two first ports, a second port, a hub unit and a graphic processor. The first ports connect the computer and a second input device. The second input device provides at least one second command. The computer executes the first command and the second command by way of time division multiplexing. The computer provides a first frame and a second frame to the first monitor and the second monitor according to the first user account and the second user account respectively.

7 Claims, 5 Drawing Sheets

(56) References Cited

U.S. PATENT DOCUMENTS

2001/0034711 A1* 10/2001 Tashenberg ........... G06F 9/4843
                                                    705/52
2002/0038333 A1*  3/2002 Evans ................... G06F 9/461
                                                    718/107
2015/0180877 A1*  6/2015 Liu ..................... H04L 63/105
                                                    726/4

OTHER PUBLICATIONS

Tremaine, R. Brett, et al. "IBM memory expansion technology (MXT)." IBM Journal of Research and Development 45.2 (2001): pp. 271-285. (Year: 2001).*

Nordlund, P., et al. "Generation expansion planning for systems with a high share of hydro power." IEEE transactions on power systems 2.1 (1987): pp. 161-167. (Year: 1987).*

Chen, Deyan, and Hong Zhao. "Data security and privacy protection issues in cloud computing." 2012 International Conference on Computer Science and Electronics Engineering. vol. 1. IEEE, 2012.pp. 647-651 (Year: 2012).*

Wang, Ting, et al. "Rethinking the data center networking: Architecture, network protocols, and resource sharing." IEEE access 2 (2014): pp. 1481-1496. (Year: 2014).*

Samdanis, Konstantinos, Xavier Costa-Perez, and Vincenzo Sciancalepore. "From network sharing to multi-tenancy: The 5G network slice broker." IEEE Communications Magazine 54.7 (2016): pp. 32-39. (Year: 2016).*

* cited by examiner

SHARING EXPANSION DEVICE, CONTROLLING METHOD AND COMPUTER USING THE SAME

This application claims the benefit of Taiwan application Serial No. 107119867, filed Jun. 8, 2018, the subject matter of which is incorporated herein by reference.

BACKGROUND OF THE INVENTION

Field of the Invention

The invention relates in general to an expansion device, a controlling method and a computer using the same, and more particularly to a sharing expansion device, a controlling method and a computer using the same.

Description of the Related Art

Along with the development in information technology, the hardware functions of the computer also keep improving. Significant improvements have been achieved particularly in areas such as computing speed, data storage and access rate.

Despite of the significant improvement on the hardware functions of the computer, the hardware functions are exclusive to the single user of the computer. Each user needs to have a computer in order to use the powerful functions of the computer.

Although the computer operating system allows many user accounts to be created on the same computer, the user must log out the current user account when he/she wants to log in the computer through another user account. At any time, the user can operate the computer through only one user account.

Although a computer can be connected to multiple input devices for multiple users to operate with, the multiple users can only operate the computer through the same user account and the same operating frame, and are unable to operate the computer independently.

SUMMARY OF THE INVENTION

The invention relates to a sharing expansion device, a controlling method and a computer using the same. The sharing expansion device enables the user(s) to concurrently and independently use the computer and share the operating system and resources of the computer through multiple user accounts.

According to one embodiment of the invention, a controlling method of a sharing expansion device is provided. The computer has at least one first user account and a second user account. The first user account has been logged in the computer. The controlling method includes following steps. When the computer is connected to the sharing expansion device, a shared login interface, through which the second user account logs in the computer, is provided. At least one first command is received from the first user account and at least one second command is received from the second user account. The first command and the second command are executed by way of time division multiplexing.

According to another embodiment of the invention, a sharing expansion device is provided. A computer has at least one first user account and a second user account. The first user account has been logged in the computer. The computer is connected to a first input device and a first monitor. The first input device is used for providing at least one first command. The sharing expansion device includes at least two first ports, a second port, a hub unit and a graphic processor. The first ports are used for connecting the computer and a second input device. The second input device is used for providing at least one second command. The computer executes the first command and the second command by way of time division multiplexing. The second port is used for connecting to a second monitor. The computer provides a first frame to the first monitor according to the first user account and provides a second frame to the second monitor according to the second user account. The hub unit connects the first ports and the second port. The graphic processor is used for processing the second frame.

According to an alternate embodiment of the invention, a computer is provided. The computer has at least one first user account and a second user account. The first user account has been logged in the computer. The computer includes a first port and a processor. The first port is used for connecting to a sharing expansion device through which the second user account logs in the computer. The processor is used for receiving at least one first command from the first user account, receiving at least one second command from the second user account and executing the first command and the second command by way of time division multiplexing.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
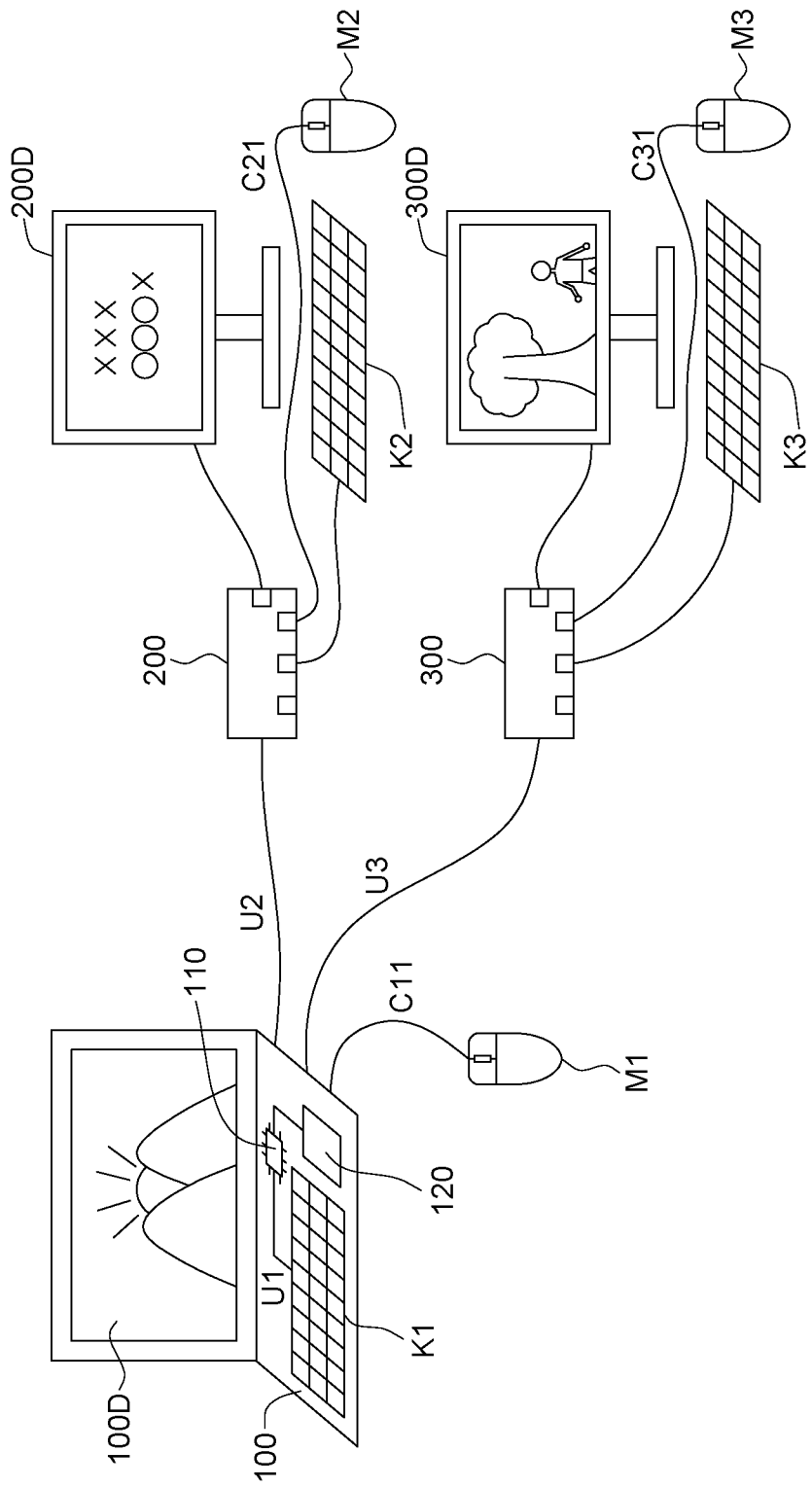
FIG. 1 is a schematic diagram of a computer and a sharing expansion device according to an embodiment.

Referring to FIG. 1, a schematic diagram of a computer 100 and sharing expansion devices 200 and 300 according to an embodiment is shown. The computer 100 can be connected to multiple sharing expansion devices such as sharing expansion devices 200 and 300 (only two sharing expansion devices are illustrated in FIG. 1 but the invention is not limited thereto). Apart from using the computer 100 through a first user account U1 that has been logged in the computer 100, a user can also use the computer 100 through a second user account U2 via the sharing expansion device 200 or through a third user account U3 via the sharing expansion device 300. When the user(s) is using the computer 100 through the second user account U2 or the third user account U3, the first user account U1 is not logged out the operating system of the computer 100. In the present embodiment, the first user account U1, the second user account U2 and the third user account U3 can concurrently log in the operating system of the computer 100 to share the operating system and resources of the computer 100.

Besides, when the user(s) is using the computer 100 through the first user account U1, the second user account U2 and the third user account U3, the operating frames are independently displayed on a first monitor 100D, a second monitor 200D and a third monitor 300D. The first user account U1 inputs a first command C11 through a first input device (such as a keyboard K1 and a mouse M1), the second user account U2 inputs a second command C21 through a second input device (such as a keyboard K2 and a mouse M2), the third user account U3 inputs a third command C31 through a third input device (such as a keyboard K3 and a mouse M3). The inputs of the first user account U1, the second user account U2 and the third user account U3 do not interfere with each other.

Figure 2:
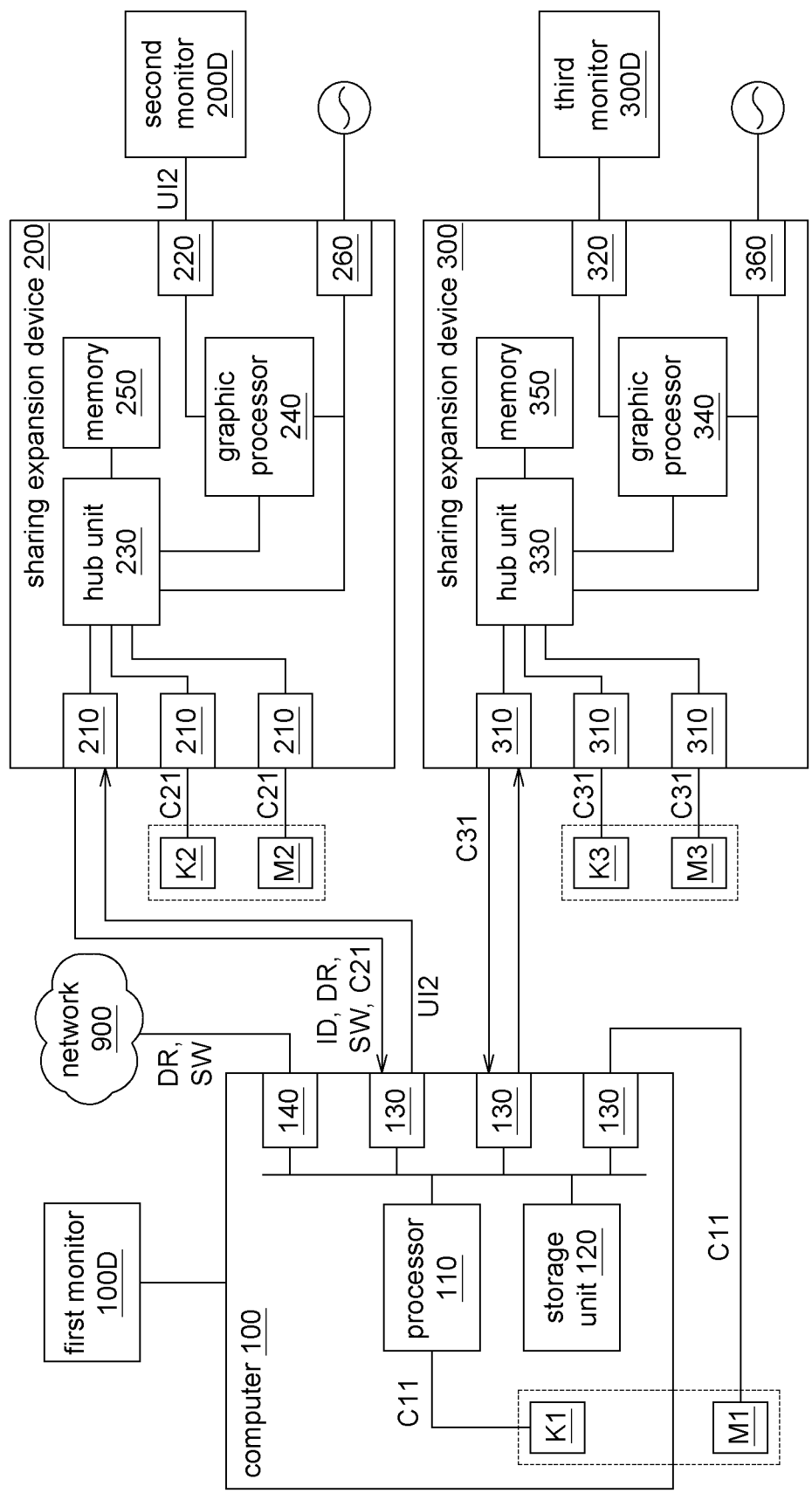
FIG. 2 is a block diagram of a computer and a sharing expansion device according to an embodiment.

Referring to FIG. 2, a block diagram of the computer 100 and the sharing expansion devices 200 and 300 according to an embodiment is shown. The computer 100 includes a processor 110, a storage unit 120 and multiple USB ports 130. The sharing expansion device 200 includes multiple USB ports 210, an HDMI port 220, a hub unit 230, a graphic processor 240, a memory 250 and a power port 260. The sharing expansion device 300 includes multiple USB ports 310, an HDMI port 320, a hub unit 330, a graphic processor 340, a memory 350 and a power port 360.

The processor 110 is used for executing various computing and processing procedures. The storage unit 120, such as a hard disk drive (HDD), or a solid state hard drive (SSD), is used for storing various data. The USB ports 130, 210 and 310 can be realized by such as USB3.0 ports or USB2.0 ports. Through the architecture provided by the sharing expansion devices 200 and 300, the user(s) can use the computer 100 through the second user account U2 via the sharing expansion device 200 or through the third user account U3 via the sharing expansion device 300. Detailed operations of each element are disclosed below with an accompanying flowchart.

Figure 3:
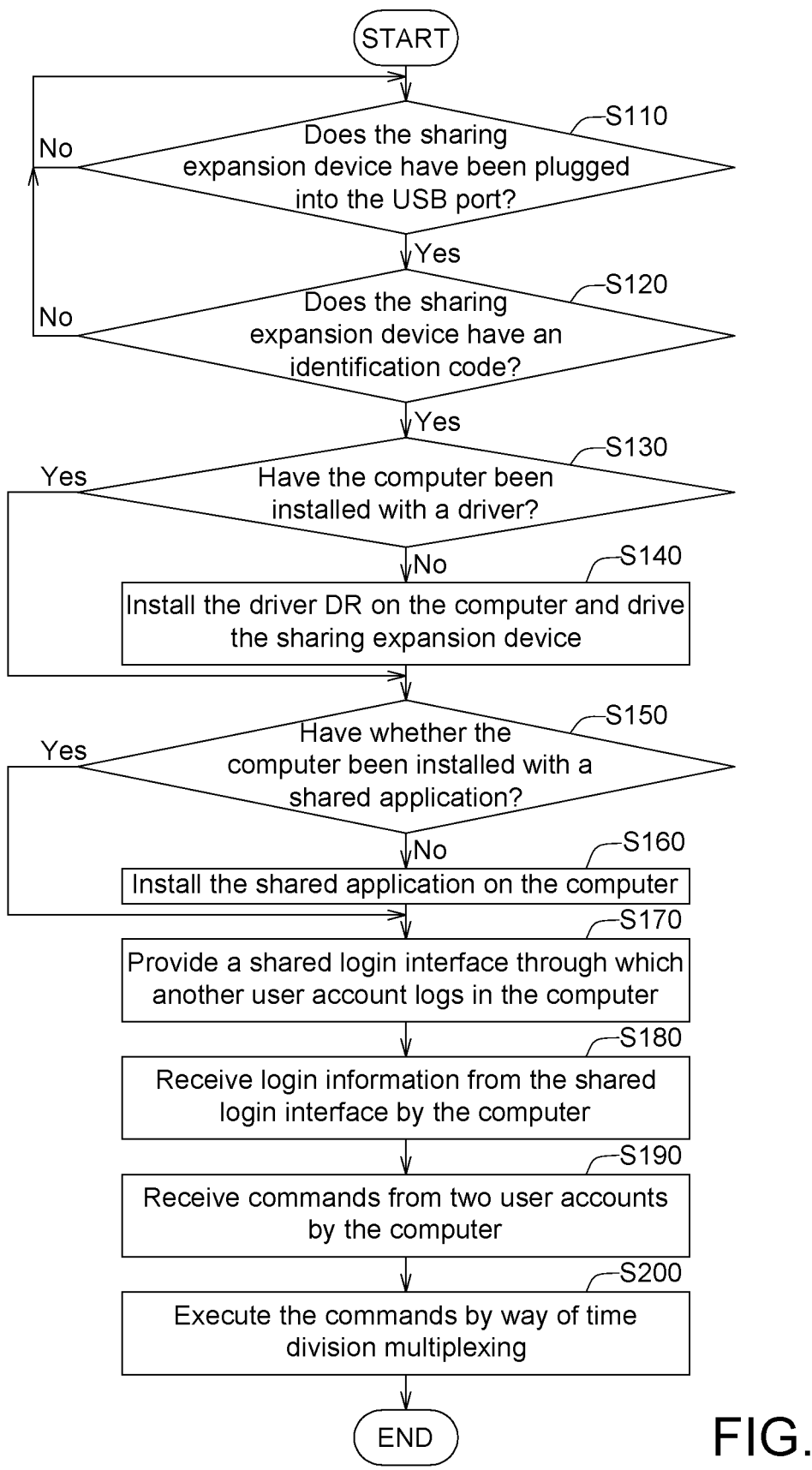
FIG. 3 is a flowchart of a controlling method of a sharing expansion device according to an embodiment.

Referring to FIG. 3, a flowchart of a controlling method of the sharing expansion devices 200 and 300 according to an embodiment is shown. The flowchart of FIG. 3 explains how the first user account U1 and the second user account U2 share the computer 100 through the sharing expansion device 200 (How the first user account U1 and the third user account U3 share the computer 100 through the sharing expansion device 300 is similar to how the first user account U1 and the second user account U2 share the computer 100 through the sharing expansion device 200, and the similarities are not repeated here). In the present embodiment, the computer 100 at least has the first user account U1 and the second user account U2, and the first user account U1 has been logged in the computer 100.

In step S110, the computer 100 determines whether the sharing expansion device 200 has been plugged into the USB port 130. If the sharing expansion device 200 has been plugged into the USB port 130, then the method proceeds to step S120. In an embodiment, the USB port 130 and the sharing expansion device 200 both can support hot plugging. Even when the computer 100 is not in a shutdown state, the sharing expansion device 200 that supports hot plugging still can be directly plugged into or unplugged from the computer 100 without causing any damages to the computer 100 or the sharing expansion device 200. The computer 100 can immediately detect and use the sharing expansion device 200.

In step S120, the computer 100 verifies whether the sharing expansion device 200 has an identification code ID. The identification code ID is stored in the memory 250 of the sharing expansion device 200. Various peripheral devices may be connected to the computer 100 through the USB port 130, so the computer 100 determines whether the peripheral device that is newly plugged to the computer 100 is the sharing expansion device 200 with sharing function by verifying the identification code ID. If the sharing expansion device 200 has the identification code ID, then the method proceeds to step S130.

In step S130, whether the computer 100 has been installed with a driver DR is determined. If the computer 100 has not been installed with the driver DR, then the method proceeds to step S140. If the computer 100 has been installed with the driver DR, then the method skips step S140.

In step S140, the driver DR is installed on the computer 100 and the sharing expansion device 200 is driven by the driver DR. The step S140 of installing the driver DR on the computer 100 is performed if it is the first time that the computer 100 uses the sharing expansion device 200. The step S140 is skipped if it is not the first time that the computer 100 uses the sharing expansion device 200 and the computer 100 has been installed with the driver DR. In step S140, the computer 100 may download the driver DR from the network 900 through the network connection unit 140 (such as a wired network port (RJ45) or a wireless network communicator).

In another embodiment, whether the computer 100 has been installed with the latest version of the driver may also be verified in step S130. If the driver installed on the computer 100 is not the latest version, then the method proceeds to step S140 to update the driver DR.

In step S150, whether the computer 100 has been installed with a shared application SW is determined. If the computer 100 has not been installed with the shared application SW, then the method proceeds to step S160. If the computer 100 has been installed with the shared application SW, then the method skips step S160. The step S160 of installing the shared application SW is needed to be performed if it is the first time that the computer 100 uses the sharing expansion device 200.

In step S160, the shared application SW is installed on the computer 100. The step S160 is skipped if it is not the first time that the computer 100 uses the sharing expansion device 200 and the computer 100 has been installed with the shared application SW. In step S160, the computer 100 may also download the shared application SW from the network 900 through the network connection unit 140.

In another embodiment, whether the computer 100 has been installed with the latest version of the shared application can also be verified in step S150. If the shared application SW installed on the computer 100 is not the latest version, then the method proceeds to step S160 to update the shared application.

Figure 4:
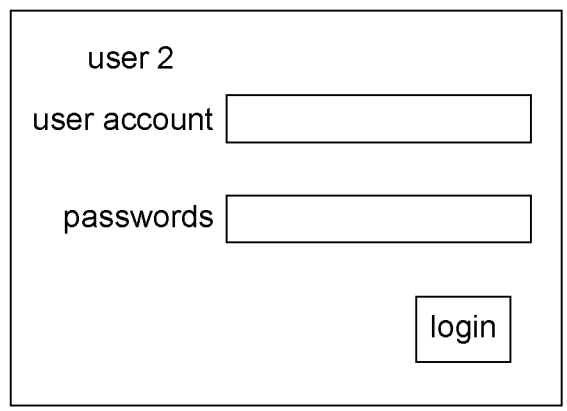
FIG. 4 is a schematic diagram of a shared login interface.

In step S170, a shared login interface U12, through which the second user account U2 logs in the computer 100, is provided. Referring to FIG. 4, a schematic diagram of a shared login interface U12 is shown. In step S170, the shared login interface U12 is provided to the sharing expansion device 200 by the computer 100, and is further transmitted to the graphic processor 240 via the hub unit 230. The graphic processor 240, after adjusting the shared login interface U12 according to the resolution of the second monitor 200D and the dimension requirement, transmits the adjusted shared login interface U12 to the second monitor 200D. The user now can see the shared login interface U12 on the second monitor 200D. It should be noted that the first monitor 100D does not display the shared login interface U12. In fact, the first monitor 100D still display the original frame. The shared login interface U12 does not affect the first user account U1 at all.

Figure 5:
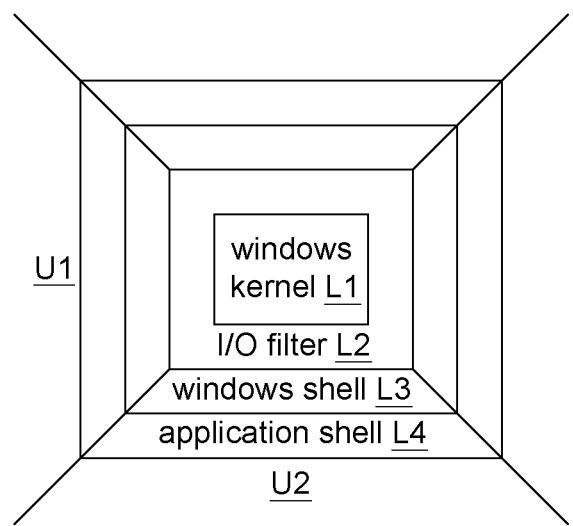
FIG. 5 is an architecture diagram of a shared expansion system.

In step S180, the computer 100 receives login information from the shared login interface U12 (such as the account number and passwords of the second user account U2), and allows the second user account U2 to log in the operating system. Referring to FIG. 5, an architecture diagram of a shared expansion system is shown. In the present embodiment, apart from having a windows kernel L1, a windows shell L3 and an application shell L4, the operating system further has an I/O filter L2 interposed between the windows kernel L1 and the windows shell L3. Once the first user account U1 and the second user account U2 both log in the operating system, the I/O filter L2 can create different work blocks on the windows shell L3 and the application shell L4 in response to the first user account U1 and the second user account U2 to separate the operation between the first user account U1 and the second user account U2.

Figure 6:
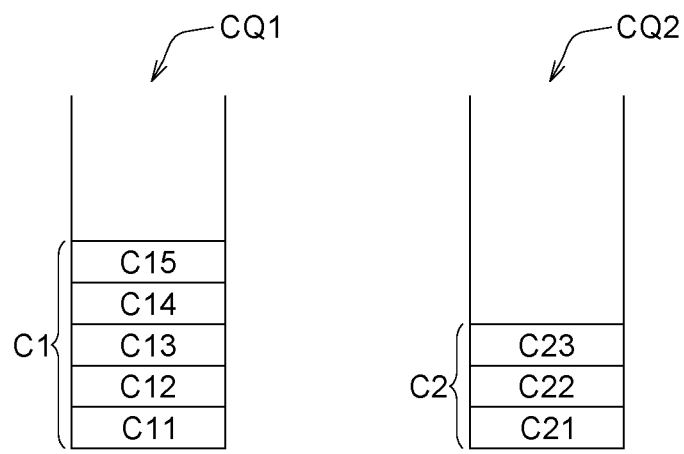
FIG. 6 is a schematic diagram of first commands and second commands.

In step S190, the computer 100 receives a first command C11 and a second command C21 from the first user account U1 and the second user account U2 respectively. The first user account U1 may input the first command C11 through the keyboard K1, the mouse M1 or other input device, and the second user account U2 may input the second command C21 through the keyboard K2, the mouse M2 or other input device. In an embodiment, the first user account U1 may continuously input multiple first commands C11, C12, C13, C14 and C15. Meanwhile, the second user account U2 may also continuously input multiple second commands C21, C22 and C23. Referring to FIG. 6, a schematic diagram of the first commands C11, C12, C13, C14 and C15 and the second commands C21, C22 and C23 is shown. The first commands C11, C12, C13, C14 and C15 are stored in a first command queue CQ1 according to their receiving orders, and the second commands C21, C22 and C23 are stored in a second command queue CQ2 according to their receiving orders.

Figure 7:
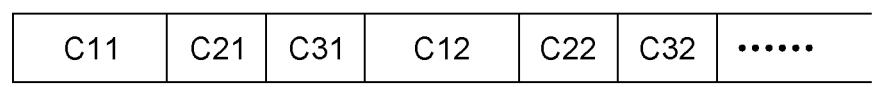
FIG. 7 illustrates an execution of time division multiplexing.

In step S200, the first commands C11, C12, C13, C14 and C15 and the second commands C21, C22 and C23 are executed by way of time division multiplexing. Refer to FIG. 7, which illustrates an execution of time division multiplexing. For the user(s) to use the computer 100 through the first user account U1 and the second user account U2 at the same time, during the time division multiplexing, the first commands C11, C12, C13, C14 and C15 and the second commands C21, C22 and C23 are accessed from the first command queue CQ1 and the second command queue CQ2 respectively according to the timing sequence. Then, the first commands C11, C12, C13, C14 and C15 and the second commands C21, C22 and C23 are executed by the processor 110. In an embodiment, a longer execution time or a larger execution frequency can be allocated to the first user account U1, so that the first user account U1 can have a better experience with the operation of the computer.

According to the above embodiments, the sharing expansion devices 200 and 300 enable the user(s) to concurrently and independently use the computer 100 and share the operating system and resources of the computer 100 through the first user account U1, the second user account U2, and the third user account U3.

While the invention has been described by example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controlling method of a sharing expansion device, wherein a computer has at least one first user account and a second user account, the first user account has been logged in the computer, and the controlling method comprises:
   verifying whether the sharing expansion device has an identification code;
   determining whether the computer has been installed with a driver if the sharing expansion device has the identification code;
   installing the driver on the computer and driving the sharing expansion device if the computer has not been installed with the driver;
   providing a shared login interface, through which the second user account logs in the computer, when the computer is connected to the sharing expansion device;
   continuously receiving a plurality of first commands from the first user account and storing the first commands in a first command queue, and continuously receiving a plurality of second commands from the second user account and storing the second commands in a second command queue; and
   executing, by turns, the first commands storing in the first command queue and the second commands storing in the second command queue by way of time division multiplexing.

2. The controlling method of sharing expansion device according to claim 1, further comprising:
   determining whether the computer has been installed with a shared application;
   installing the shared application on the computer for activating the shared login interface if the computer has not been installed with the shared application.

3. The controlling method of sharing expansion device according to claim 1, wherein the computer is connected to a first monitor, the sharing expansion device is connected to a second monitor, and the computer provides a first frame to the first monitor according to the first user account and provides the second monitor to the second monitor according to the second user account.

4. A sharing expansion device, wherein a computer has at least one first user account and a second user account, the first user account has been logged in the computer, the computer is connected to a first input device and a first monitor, the first input device is used for continuously providing a plurality of first commands which are storing in a first command queue, and the sharing expansion device comprises:
   a memory used for storing an identification code and a driver, wherein if the computer verifies that the sharing expansion device has the identification code and the computer has not been installed with the driver, then the driver is provided to be installed on the computer and the sharing expansion device is driven by the driver;
   at least two first ports used for connecting the computer and a second input device, wherein the second input device is used for continuously providing a plurality of second commands which are storing in a second command queue, and the computer executes, by turns, the first commands storing in the first command queue and the second commands storing in the second command queue by way of time division multiplexing;
   a second port used for connecting to a second monitor, wherein the computer provides a first frame to the first monitor according to the first user account and provides a second frame to the second monitor according to the second user account;

a hub unit used for connecting the first ports and the second port; and a graphic processor used for processing the second frame.

5. The sharing expansion device according to claim 4, wherein the memory stores a shared application; if the computer has not been installed with the shared application, then the shared application is provided to be installed on the computer, and the shared login interface is activated.

6. A computer having at least one first user account and a second user account, wherein the first user account has been logged in the computer, and the computer comprises:

a port used for connecting to a sharing expansion device which provides a shared login interface through which the second user account logs in the computer; and a processor used for continuously receiving a plurality of first commands from the first user account, storing the first commands in a first command queue, continuously receiving a plurality of second commands from the second user account, storing the second commands in a second command queue and executing, by turns, the first commands and the second commands by way of time division multiplexing, wherein the processor is further used for verifying whether the sharing expansion device has an identification code; if the sharing expansion device has the identification code and the computer has not been installed with a driver, then the driver is installed on the computer and the sharing expansion device is driven by the driver.

7. The computer according to claim 6, wherein the computer is connected to a first monitor, the sharing expansion device is connected to a second monitor, and the computer provides a first frame to the first monitor according to the first user account and provides a second frame to the second monitor according to the second user account.

* * * * *